United States Patent [19]

Abadia

[11] Patent Number: 5,621,265
[45] Date of Patent: Apr. 15, 1997

[54] ALTERNATOR SUPPLY AND CONTROL UNIT

[75] Inventor: Roger Abadia, Neuilly-Plaisance, France

[73] Assignee: Valeo Equipements Electriques Moteur, Creteil, France

[21] Appl. No.: 394,253

[22] Filed: Feb. 24, 1995

[30] Foreign Application Priority Data

Feb. 28, 1994 [FR] France ................... 94 02243

[51] Int. Cl.⁶ .................................. H02K 11/00
[52] U.S. Cl. ........................ 310/68 D; 310/71
[58] Field of Search ............ 310/680, 71, 68 R; 363/145, 144

[56] References Cited

U.S. PATENT DOCUMENTS

| 4,065,686 | 12/1977 | Moore | 310/68 D |
|---|---|---|---|
| 4,103,193 | 7/1978 | Ito | 310/68 D |
| 4,137,560 | 1/1979 | Moore | 363/145 |
| 4,606,000 | 8/1986 | Steele et al. | 363/145 |
| 4,616,149 | 10/1986 | Best | 310/71 |
| 4,799,309 | 1/1989 | Cinzori et al. | 29/596 |
| 5,563,462 | 10/1996 | Strobl et al. | 310/71 |

FOREIGN PATENT DOCUMENTS

| 0484287 | 6/1992 | European Pat. Off. |
| 2514962 | 4/1983 | France |
| 3409-333 | 9/1985 | Germany |
| 55-10871 | 1/1980 | Japan |

Primary Examiner—Steven L. Stephan
Assistant Examiner—Jonathan Link
Attorney, Agent, or Firm—Morgan & Finnegan, L.L.P.

[57] ABSTRACT

The invention proposes a supply and control unit for an alternator in a motor vehicle, of the type comprising a support plate (12) made from insulating material designed to be fixed to a fixed part of the alternator and a brush-holder (22), and of the type in which the support plate (12) bears on a first face (34) an integrated circuit (36) for regulating the voltage supplied by the alternator, the electric connection pins (42) of which extend through the material (18) of the support plate (12) in order to open into a housing (46) formed in the second face (18) of the support plate (12), and of the type comprising an electric connection circuit (50) which comprises connection lugs (56) in contact with the connection pins (42) of the integrated circuit (36), characterised in that the connection pins (42) of the integrated circuit (36) are disposed in a circle.

7 Claims, 4 Drawing Sheets

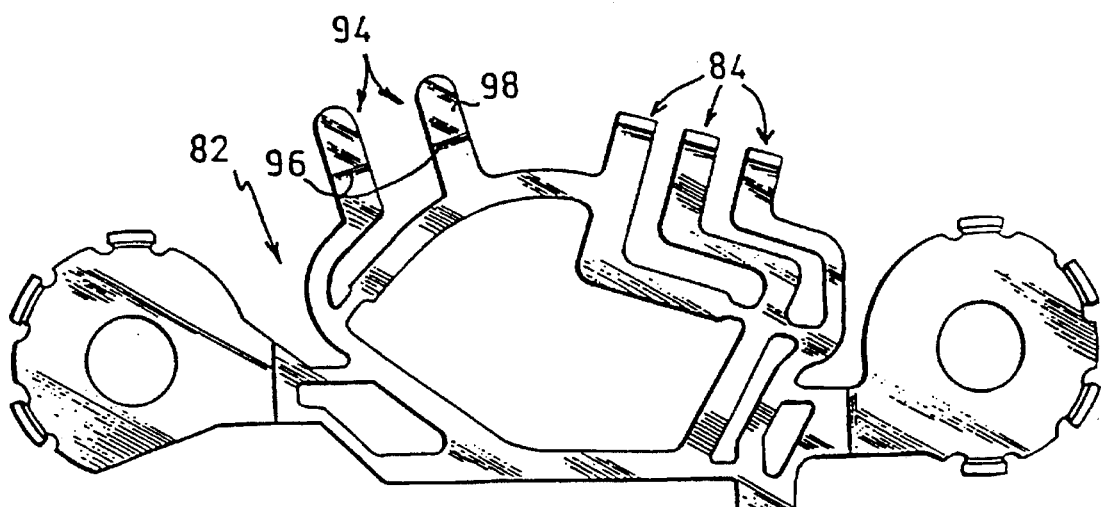
FIG. 7   FIG. 6
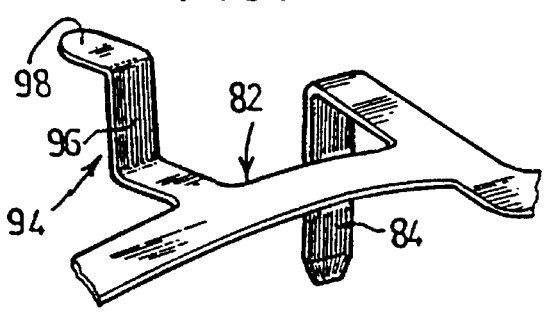
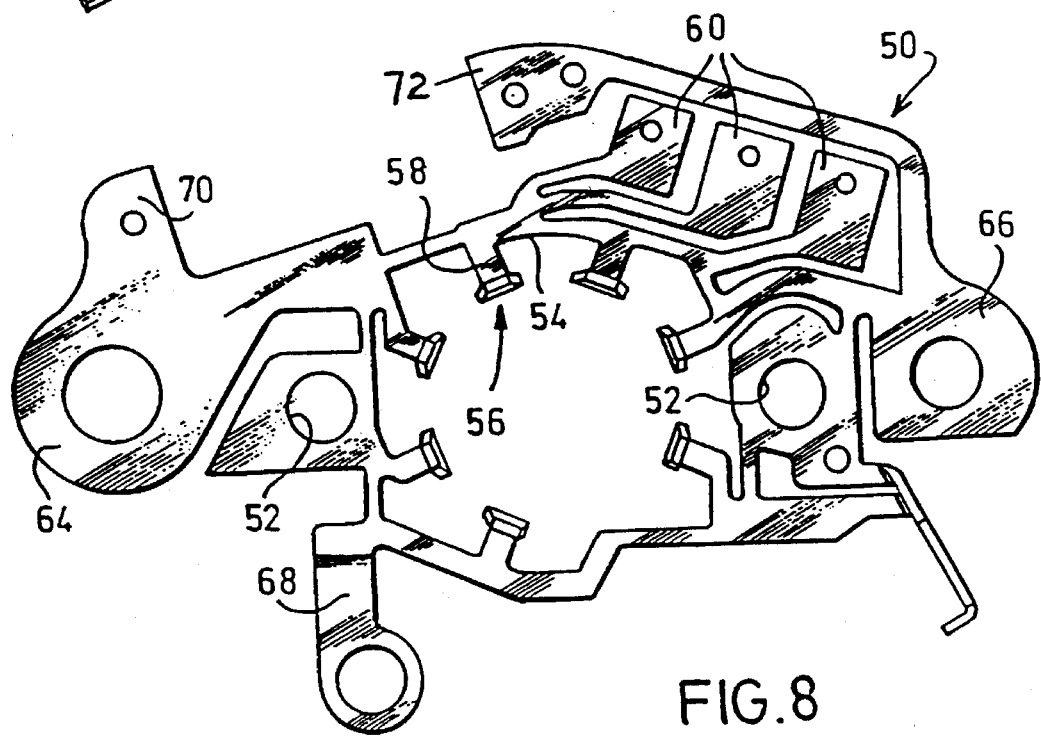
FIG. 8

ALTERNATOR SUPPLY AND CONTROL UNIT

FIELD OF THE INVENTION

The present invention relates to an improved supply and control unit for an alternator, in particular as equipment for a motor vehicle.

The invention more particularly relates to a supply unit of the type comprising a support plate made of insulating material designed to be fixed to a fixed part of the alternator, and a brush holder, in which the support plate bears, on a first face, an integrated circuit for regulating the voltage provided by the alternator, the electric connection arms of which extend through the material of the support plate in order to open into a housing formed in the second face of the support plate, and of the type comprising an electric connection circuit which comprises connection lugs in contact with connection pins of the integrated circuit.

BACKGROUND OF THE INVENTION

In the design of such a type of supply and control unit for an alternator in a motor vehicle, it is necessary to be able to have available the largest possible number of electrical functions, which are controlled by the integrated circuit, and it is therefore necessary that the integrated circuit possesses a large number of connection pins for which the reliable electric connection with the connection lugs of the electric connection circuit of the unit has to be ensured.

In the known designs, such as, for example, that described and represented in document EP-A-0 484 287, the integrated circuit only has a few connection arms which are difficult to connect electrically, for example by welding, to the electric connection circuit and in particular because of the shortage of available space for these operations.

DISCUSSION OF THE INVENTION

In order to remove these drawbacks, the invention proposes a unit of the type mentioned above, characterised in that the connection pins of the integrated circuit are disposed in a circle.

According to other characteristics of the invention:

the connection pins are distributed angularly in a regular manner;

the connection pins partially protrude from the housing, beyond the second face of the support plate;

the housing comprises a lateral wall having a general cylindrical shape;

each of the connection lugs extends axially along one of the corresponding connection pins;

one of the ends of each connection lug is extended by a coupling arm bent at right angles which extends in the housing from the lateral wall of the housing;

the connection circuit comprises a metal connection blank, partially embedded in the insulating material of the support plate, and the connection lugs are formed by parts, not covered with insulating material and bent, of the metal blank;

the unit comprises a generally plate-shaped cover made of insulating material designed to cover the second face of the support plate;

the lower face of the cover disposed opposite the second face of the support plate comprises a series of partitions made from insulating material, produced in one piece by moulding with the cover, which extend in protruding manner inside the housing formed in the second face of the support plate, between the connection pins of the integrated circuit.

BRIEF DESCRIPTION OF THE DRAWINGS

Other characteristics and advantages of the invention will become apparent from reading the following detailed description, for the understanding of which reference will be made to the attached drawings in which:

FIG. 6 is an underneath view, similar to that in FIG. 4, of the metal branching blank belonging to the cover of the unit illustrated in FIG. 4;

FIG. 7 is a detailed perspective view of the metal branching blank illustrated in FIG. 6; and FIG. 8 is a top view, on a larger scale, of the metal connection blank belonging to the support plate illustrated in FIGS. 2 and 3.

DESCRIPTION OF THE PREFERRED EMBODIMENT

The unit 10 illustrated in the figures is essentially formed by a lower support plate 12 and by an upper cover in the form of plate 14.

Figure 5:
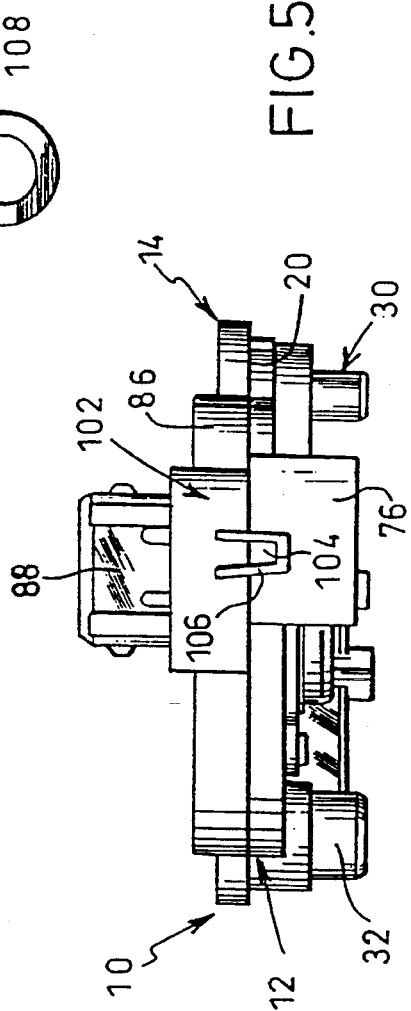
FIG. 5 is a lateral front view, on a smaller scale, of the unit illustrated in FIG. 1, along arrow F of this figure.

The support plate 12 is essentially formed by a plate 16 made of insulating material, the generally planar upper face 18 of which forms the joint face with the lower face 20 of the cover 14 (see FIG. 5).

The unit 10 also comprises a brush-holder device or unit 22 which is essentially formed by a body made of insulating material 24 which is produced in a single piece by moulding with the lower support plate 12.

The brush-holder unit 22, of a known design, in particular comprises two brushes 26 designed to cooperate with strip conductors (not represented) of the rotor shaft of the alternator.

Before being mounted on the alternator, the brush holder 22 may comprise a removable cap 28 (illustrated in silhouette on FIG. 2) which protects the brushes 26.

The plate-shaped body 16 of the support plate 12 has two projections in the form of bushes 30 and 32 serving in particular for the attachment of the unit 10 and for the electric connection of the latter to the earth of the body of the alternator.

The support plate 12 also bears, on its lower face 34, an integrated circuit designated by the general reference 36, the support plate 38 of which comprises two attachment studs 40 which are partially embedded in the insulating material of the plate 16.

The integrated circuit 36 comprises a series of seven connection pins 42 which extend vertically upwards from the upper face 44 of the plate 38 turned towards the lower face 34 of the plate 16 and which passes through the insulating material to open into a housing 46 formed as a hollow in the upper face 18 of the plate 16.

The housing 46 has a cylindrical peripheral wall 48 and the seven connection pins 42 are disposed regularly in a circle inside the housing 46 radially towards the interior in relation to the lateral wall 48.

Figure 3:
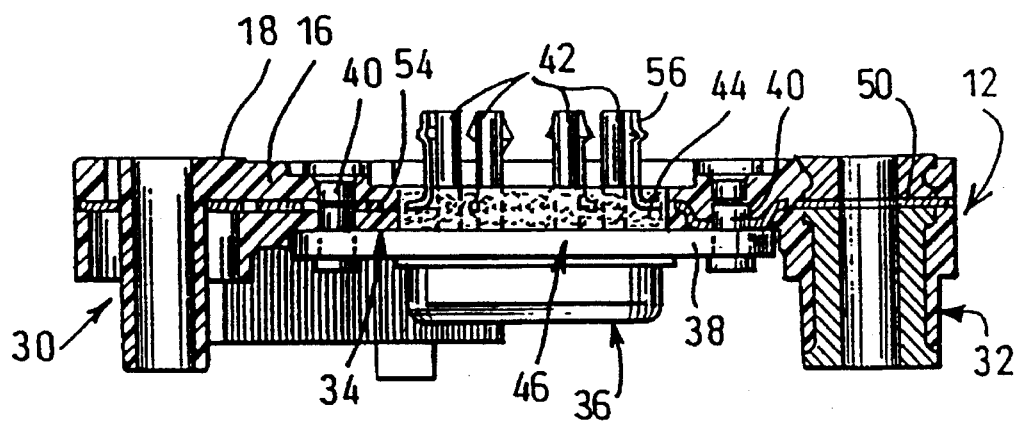
FIG. 3 is a cross-sectional view along line 3—3 of FIG. 2.

As can be seen in particularly on FIG. 3, the connection pins 42 protrude axially from the housing 46 beyond the upper face 18 of the body 16 of the support plate 12.

The electric connection of the connection pins 42 to the brush holder 22 and to the outside is provided by means of a metal connection blank 50, illustrated in detail on FIG. 8, which is a blank made of stamped and bent metal sheet.

The blank 50 is partially embedded in the insulating plastic material forming the body 16 of the support plate 12, at the time of the moulding operation of the latter.

In particular it comprises openings 52 for the passage of the studs 40 of the integrated circuit 36 and a main central aperture 54 which extends around the housing 46.

Figure 1:
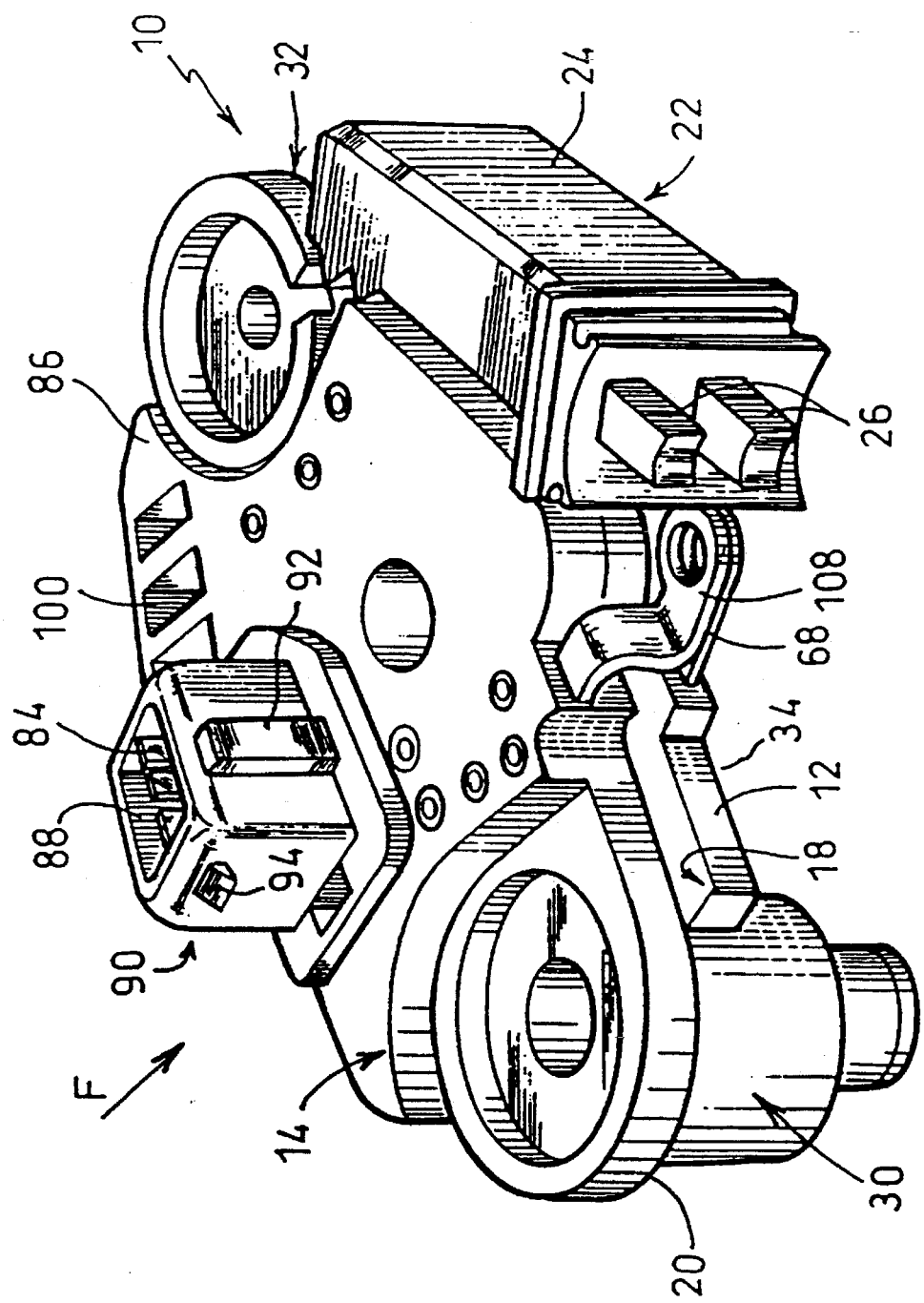
FIG. 1 is a general perspective view of an exemplary embodiment of a supply and control unit for an alternator in a motor vehicle, produced in accordance with the teachings of the invention.
Figure 2:
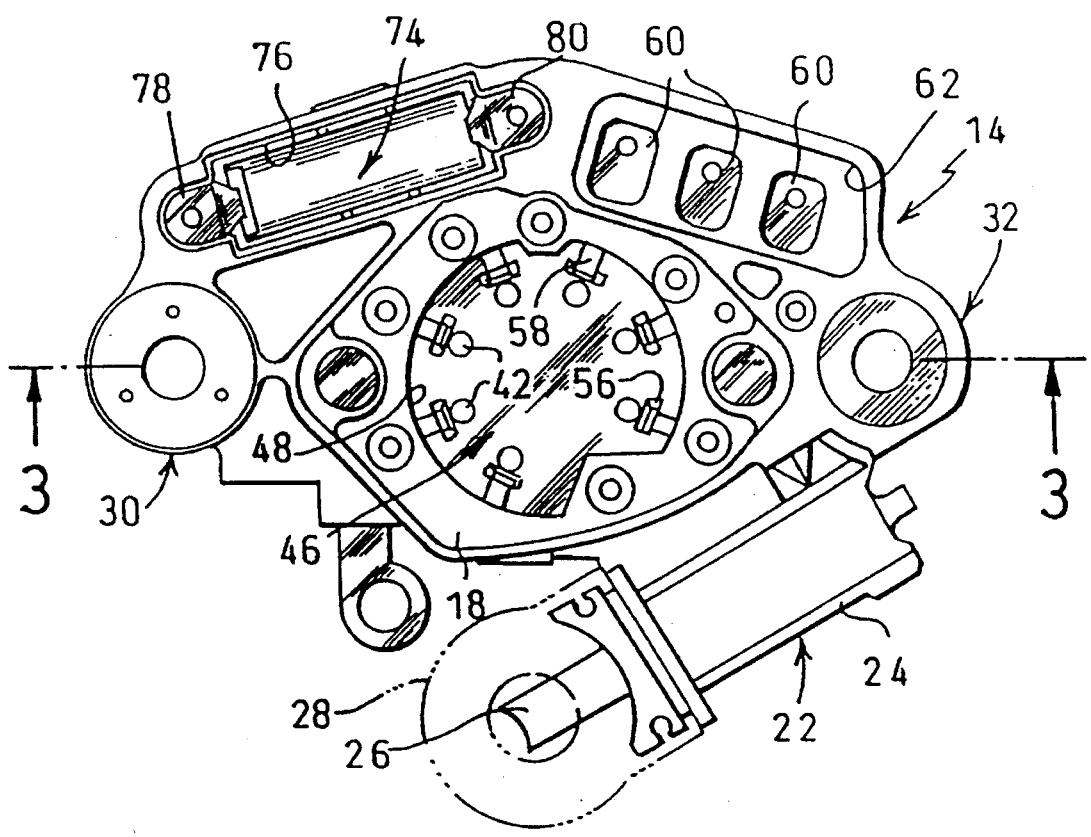
FIG. 2 is a top view of the support plate of the unit illustrated in FIG. 1.

The metal electric connection blank 50 comprises a series of seven connection lugs 56, each of which extends vertically along a corresponding connection pin 42 (see FIGS. 2 and 3).

For this purpose, each connection lug 56 is connected to the edge of the aperture 54 by a coupling lug 58 which extends in the general plane of the electric connection blank 50 and which is lengthened by the connection lug 56 itself which extends vertically at right angles in relation to the plane of the connection blank 50.

The free end of each of the lugs 56 is designed to be welded to the opposite portion of the free end of a corresponding electric connection pin 42 of the integrated circuit 36.

The connection lugs 56 may have such dimensions and may be shaped so that they are in a slight elastic engagement against the corresponding connection pins 42, before the welding operation, and in such a manner as to ensure better electrical contact.

In this embodiment, the electric connection blank 50 also comprises three coplanar electric contact zones 60 which, as can be seen on FIG. 2, are not covered by the insulating material forming the body 16 of the support plate 12 and which are disposed in a window 62 formed for this purpose in the upper face 18 of the support plate (see FIG. 2).

The electric connection blank 50 comprises two connection disks 64 and 66 in order to allow the passage of attachment components of the unit 10 through the bushes 30 and 32 with an electric earth contact.

Finally, the electric connection blank 50 comprises an outer terminal 68 and two opposite connection lugs 70 and 72 which are coplanar and not covered in insulating material.

The purpose of the lugs 70, and 72 is to enable the electric connection of a capacitor 74 which is housed in a case 76 produced in one piece with the body 16 of the support plate 12 made from moulded insulating material, which opens into the upper face 18 of the latter and which extends vertically downwards.

The capacitor 74, which has a general rectangular parallelepiped shape complementary to that of the case 76, comprises two electric connection lugs 78 and 80 which are designed to come into electrical contact with the connection zones 70 and 72 of the electric connection blank 50 when the capacitor is in position in the case 76.

Figure 4:
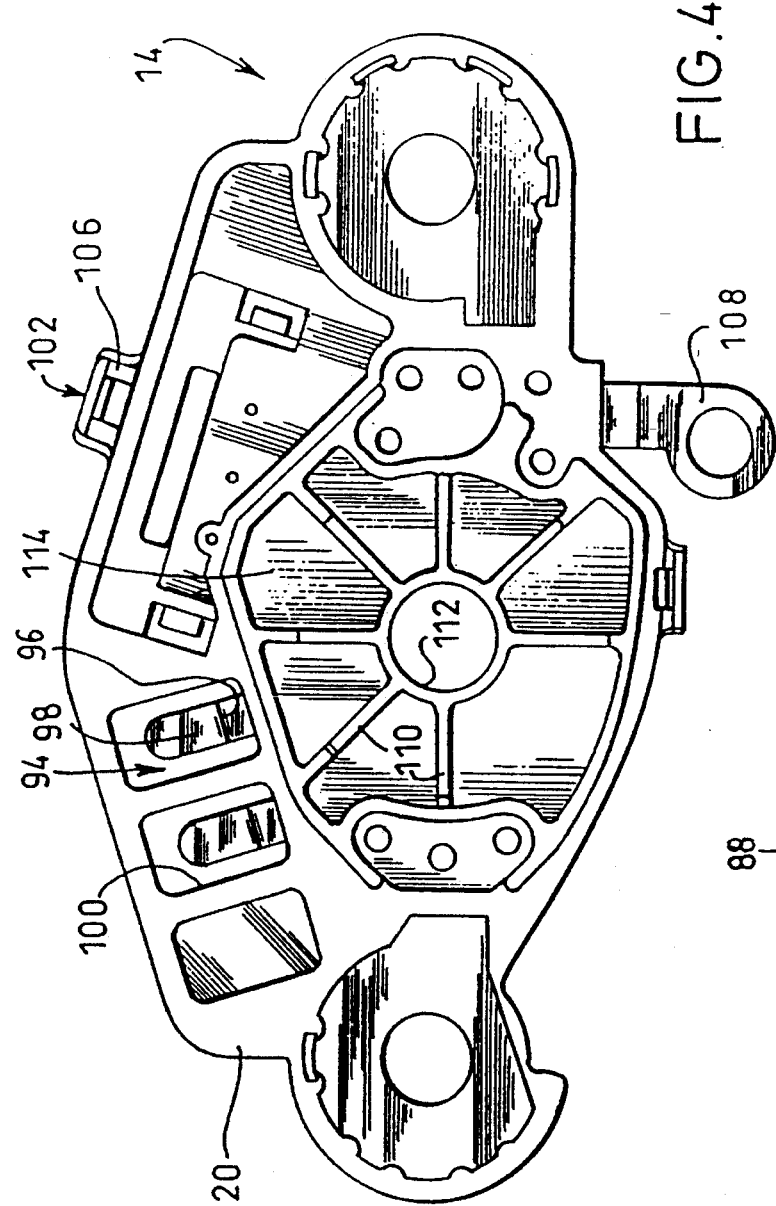
FIG. 4 is a view, on a larger scale, of the lower face of the cover of the unit illustrated in FIG. 1.

The cover 14, which is in particular illustrated on FIG. 4, is a generally plate-shaped component moulded from electrically insulating material.

The insulating material of the cover 14 is moulded onto an electric branching blank 82, which is illustrated in detail in FIG. 6, which is made from stamped and bent sheet metal.

The electric branching blank 82 comprises three branch terminals 84 which are disposed on the periphery of the electric branching blank 82 and which extend vertically at right angles in relation to the general plane of the electric branching blank 82 and upwardly beyond the upper face 86 of the cover 14.

These branch lugs 84 extend inside a housing made from insulating material 88 produced in one piece by moulding with the body, made of insulating material, of the cover 14 in order to form a branching socket 90 of the unit 10.

The body made of insulating material 88 of the socket 90 may comprise, on its outer peripheral wall, guiding 92 and locking 94 means designed to cooperate with a corresponding socket (not shown) belonging to an electric cable loom of the motor vehicle.

In the embodiment illustrated on the figures, the socket 90 is a straight socket which extends axially beyond the upper face 86, i.e. in a direction roughly parallel to the electric connection pins 42 of the integrated circuit 36 and parallel to the axis of rotation of the alternator (not represented).

In this embodiment, the electric branching blank 82 also comprises two electric coupling lugs 94, each of which is formed by a vertical arm 96 which extends vertically downwardly, i.e. in the opposite direction to the electric branch terminals 84, and each of which ends in an end 98 bent at 90° which thus extends parallel to the general plane of the electric branching blank 82.

As can be seen in particular on FIG. 4, each of the electric coupling lugs 94 extends in a window 100 formed in the body made of insulating material of the cover 14.

The electric coupling lugs 94 are spaced from one another so as to be able to come opposite the electric connection zones 60 of the electric connection blank 50 and in electrical contact therewith when the cover is in a fixed position on the support plate 12.

The cover 14 is kept in position on the lower support plate 12 for example by a hooking device 102 produced in one piece by moulding respectively with the body 16 of the support plate 12, in the form of a catch 104 and, respectively, with the body of the cover 14 in the form of a U-shaped hooking lug 106 (see FIG. 5).

According to the various models of unit 10, it is possible to provide one, two or three lugs 94 which come into contact with the zones 60 of the electric connection circuit formed by the metal blank 50.

The electric branching circuit formed by the metal blank 82 also comprises an elbowed outer terminal 108 which comes to cooperate electrically with the flat outer terminal 68 of the electric connection blank 50.

The design according to the invention of the unit 10 enables the use of an integrated circuit comprising a large number of electric connection pins 42 which are advantageously disposed regularly in a circle in order to facilitate their electric connection to the lugs 56 and their welding.

Before mounting the cover 14 on the support plate 12, it is possible to attach the coupling lugs 94 by electric resistance welding to the zones 60 and also the outer terminals 68 and 108.

After these resistance welding operations, the windows 100 may be covered by a mastic made of electric insulating material.

The two-part design of the unit 10 also enables very good electrical insulation to be ensured between the various electric connection pins 42 of the integrated circuit.

For this purpose, and as can be seen on FIG. 4, the lower face 20 of the cover 14 comprises a series of seven electric insulating partitions 110 which are produced in one piece by moulding with the body, made of insulating material, of the cover 14.

The partitions 110 project vertically from the lower face 20 of the cover 14 in order to extend between the connection pins 42 and partially inside the housing 46.

The insulating partitions 110 are disposed radially around a tubular core 112 which increases the rigidity of the unit and with the partitions 110 delimits housings 114, the continuous lateral wall of each being made from insulating material and each of which receiving an electric connection pin 42 and an associated electric connection lug 56.

What we claim:

1. A supply and control unit for an alternator of a motor vehicle, of the type comprising a support plate made of insulating material to be fixed to a fixed part of the alternator and a brush holder, and of the type in which the support plate supports on a first face an integrated circuit for regulating the voltage provided by the alternator, the electric connection pins of which extend through the material of the support plate in order to open into a housing formed in the second face of the support plate, and of the type having an electric connecting circuit which includes connection lugs in contact with the connection pins of the integrated circuit, wherein the connection pins of the integrated circuit are disposed in a circle, further including a generally plate-shaped cover made of insulating material designed to cover the second face of the support plate, and wherein the face of the cover, disposed opposite the second face of the support plate has a series of partitions made of insulating material, produced in one piece by molding with the cover, which extend in protruding manner inside the housing formed in the second face of the support plate, between the connection pins of the integrated circuit.

2. A unit according to claim 1, wherein the electric connection pins of the integrated circuit are distributed angularly in a regular manner.

3. A unit according to claim 1, wherein the connection pins partially protrude from the housing, beyond the second face of the support plate.

4. A unit according to claim 1, wherein the housing comprises a lateral wall having a general cylindrical shape.

5. A unit according to claim 1, wherein each of the connection lugs extends axially along a corresponding connection pin.

6. A unit according to claim 5, wherein one of the ends of each connection lug is extended by a coupling arm bent at right angles which extends in the housing from the lateral wall of the housing.

7. A unit according to claim 1, wherein the connection circuit comprises a metal connection blank, partially embedded in the insulating material of the support plate, and the connection lugs are formed by parts, not covered with insulating material and bent, of the metal blank.

* * * * *